Patented Nov. 9, 1948

2,453,634

UNITED STATES PATENT OFFICE 2,453,634

GLYCIDYL ETHERS

Kenneth E. Marple, Oakland, Calif., assignor to Shell Development Company, San Francisco, Calif., a corporation of Delaware No Drawing. Application May 27, 1944, Serial No. 537,729

3 Claims. (Cl. 260—348)

This invention relates to new and useful glycidol derivatives wherein the hydroxy group has been replaced by —OR$_1$ (R$_1$ representing a 3,3,5-trialkylcyclohexyl radical), and to a process for their production. The scope of the invention includes the 3,3,5-trialkylcyclohexyl ethers of 1,2- or 1,3-glycidol as well as of the corresponding hydrocarbyl glycidols, i. e., those glycidols having one or more hydrocarbon radicals directly attached to one or more of the glycidyl carbon atoms. The glycidyl ethers to which this invention relates may be represented by the formula

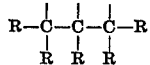

wherein each R represents a member of the group comprising the hydrogen atom and the hydrocarbon radicals and wherein two of the unsatisfied bonds are directly linked to the same oxygen atom, and the remaining unsatisfied bond is directly attached to —OR$_1$ (R$_1$ representing a 3,3,5-trialkylcyclohexyl radical). The invention is particularly concerned with the 3,3,5-trialkylcyclohexl ethers of the 1,2-glycidols corresponding to the formula

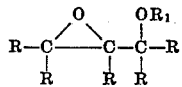

One of the most specific embodiments of the invention comprises those glycidyl 3,3,5-trialkylcyclohexyl ethers wherein the 3,3,5-trialkylcyclohexyl radical is 3,3,5-trimethylcyclohexyl.

An object of the invention is to provide new 3,3,5-trialkylcyclohexyl ethers of glycidols which have value as solvents, diluents, modifying agents, as processing agents in the textile industry, and which serve as intermediates in the syntheses of valuable organic products, as reagents and/or additives in the formation of synthetic resins, plastics and synthetic rubbers, as insecticides, fungicides, parasiticides or as constituents of insecticidal, fungicidal and parasiticidal compositions, etc. They may also be useful as humectants and emulsifying agents, and are particularly valuable in the formation of polymers and as softeners and plasticizers, e. g. for nitrocellulose films. A further object of the invention is to provide methods for the preparation of the glycidyl ethers of the class herein disclosed.

The 3,3,5-trialkylcyclohexyl ethers of the glycidols may be prepared by any suitable method such as by the reaction of the sodium alcoholate of the corresponding 3,3,5-trialklcyclohexanol with a 1,2- or a 1,3-epihalohydrin, or by the dehydration of the corresponding glycerol 3,3,5-trialkylcyclohexyl monoether. A method which has been found particularly suitable and convenient comprises reacting the corresponding glycerol 3,3,5-trialkylcyclohexyl monoether monohalohydrin with a basic or basic-reacting compound capable of effecting the removal of one mole of hydrogen halide from one mole of the halohydrin ether treated, for example a caustic such as sodium hydroxide. The glycerol 3,3,5-trialkylcyclohexyl ether monohalohydrin may be produced by reacting an epihalohydrin with a 3,3,5-trialkylcyclohexanol in the absence or presence of a catalyst such as stannic chloride. The glycerol 3,3,5-trialkylcyclohexyl monoether monohalohydrin is represented by the formula

wherein one of the unsatisfied bonds is directly attached to —OR$_1$, one of the remaining unsatisfied bonds is directly attached to —OH, and the remaining unsatisfied bond is directly attached to a halogen atom such as chlorine, bromine or iodine, etc. When a glycerol alpha-(3,3,5-trialkylcyclohexyl) monoether gamma-monohalohydrin or a glycerol alpha-(3,3,5-trialkylcyclohexyl) monoether beta-monohalohydrin is treated with caustic, a 1,2-glycidyl 3,3,5-trialkylcyclohexyl ether is produced; the reaction of a caustic with a glycerol beta-(3,3,5-trialkylcyclohexyl) monoether gamma-monohalohydrin results in the production of a 1,3-glycidyl 3,3,5-trialkylcyclohexyl ether.

The hydrocarbon radicals which R may represent may be saturated or unsaturated, cyclic or acyclic, and may be selected from the group comprising the alkyl, aryl, alkenyl, aralkyl, aralkenyl, alkenaryl, cycloalkyl, polyakylcycloalkyl and cycloalkenyl radicals such as methyl, ethyl, propyl, isopropyl, butyl, isobutyl, tertiary butyl, benzyl, phenyl, vinyl, allyl, methallyl, crotyl cyclopentyl, cyclohexenyl, 3,3,5-trimethylcyclohexyl, cyclohexadienyl, etc., and the like and their homologues.

R$_1$ may represent any suitable 3,3,5-trialkylcyclohexyl radical. The three alkyl groups by which the cyclohexyl radical is substituted in the 3,3,5-positions may all be the same or different. Suitable alkyl radicals are methyl, ethyl, propyl, isopropyl, butyl, isobutyl, tertiary butyl, secondary butyl, amyl, isoamyl, hexyl, heptyl, octyl and the like.

The following examples serve to illustrate the invention.

Example I

Cis-dihydroisophorol and 1,2-epichlorohydrin in a mole ratio of about 3:1 were reacted in the presence of about 0.01 mole of stannic chloride per mole of epichlorohydrin while maintaining the temperature at about 90° C. for about one-half hour, to produce the cis-dihydroisophoryl ether of alpha-monochlorohydrin which was then treated with about a 25% aqueous sodium hydroxide solution at about 80° C. to about 90° C. for approximately four hours to form a product containing the 1,2-glycidyl cis-dihydroisophoryl ether. The upper layer was separated, neutralized and fractionally distilled to give a conversion of approximately 82.4%.

Example II

Glycidyl trans-dihydroisophoryl ether was prepared by reacting trans-dihydroisophorol and 1,2-epichlorohydrin in a mole ratio of about 3:1 in the presence of about 0.01 mole of stannic chloride per mole of epichlorohydrin while maintaining the temperature at about 90° C. to about 100° C. for about two hours and reacting the resultant trans-dihydroisophoryl ether of glycerol alpha-monochlorohydrin with a solution of about 30% aqueous sodium hydroxide at about 90° C. for approximately one and one-half hours. A yield of 1,2-glycidyl trans-dihydroisophoryl ether of about 90% was obtained.

Example III

Following the procedure described in Example I, 3,3,5-triethylcyclohexanol and 1,2-epichlorohydrin are reacted in the presence of stannic chloride, and the resultant monochlorohydrin ether is treated with sodium hydroxide to produce a good yield of 1,2-glycidyl 3,3,5-triethylcyclohexyl ether.

Example IV 3,3,5-tripropylcyclohexanol and 1,3-epichlorohydrin are reacted in the presence of stannic chloride, and the resultant glycerol beta-(3,3,5-tripropylcyclohexyl) ether gamma-monochlorohydrin is treated with caustic according to the procedure described in Example I to produce a good yield of 1,3-glycidyl 3,3,5-tripropylcyclohexyl ether.

Example V

Trans-dihydroisophorol and 1,3-epichlorohydrin are reacted in the presence of stannic chloride, and the resultant glycerol beta-(trans-dihydroisophoryl) ether gamma-monochlorohydrin is treated with caustic in the manner described in Example I to produce a good yield of 1,3-glycidyl trans-dihydroisophoryl ether.

Example VI 1,3-glycidyl trans-dihydroisophoryl ether may also be prepared by reacting trans-dihydroisophorol and 1,3-epibromohydrin in the presence of stannic chloride, and treating the resultant glycerol beta-(trans-dihydroisophoryl) ether monobromohydrin with caustic according to the procedure described in Example I.

By obvious modifications of the procedures described in the above examples, one may prepare: 1,2-glycidyl 3,3,5-triethylcyclohexyl ether; 1,2-glycidyl 3,3,5-tripropylcyclohexyl ether; 1,2-glycidyl 3,3,5-triisopropylcyclohexyl ether; 1,2-glycidyl 3,3-dimethyl 5-ethylcyclohexyl ether; 1,2-glycidyl 3,5-dimethyl 5-propylcyclohexyl ether; 1,2-glycidyl 3-methyl 3-butyl 5-butylcyclohexyl ether; 1,2-glycidyl 3,3,5-triamlcyclohexyl ether; and the corresponding ethers of 1,3-glycidol and the like and their homologues.

I claim as my invention:

1. A process for the production of a 3,3,5-trialkylcyclohexyl ether of a glycidol which comprises reacting the corresponding 3,3,5-trialkylcyclohexyl ether of a glycerol monohalohydrin with a basic-reacting compound capable of effecting the removal of one mole of hydrogen halide from one mole of the halohydrin ether at a temperature of about 80° C. to about 90° C.

2. A process for the production of 2,3-epoxypropyl 3,3,5-trimethylcyclohexyl ether which comprises reacting the 3,3,5-trimethylcyclohexyl ether of glycerol alpha-monochlorohydrin with an amount of an alkali metal hydroxide capable of effecting the removal of one mole of hydrogen halide from one mole of the halohydrin ether at a temperature of from about 80° C. to about 90° C.

3. A process for the production of a 2,3-epoxypropyl ether of a 3,3,5-trialkylcyclohexanol which comprises reacting the corresponding 3,3,5-trialkylcyclohexyl ether of a glycerol monohalohydrin with a basic-reacting compound capable of effecting the removal of one mole of hydrogen halide from one mole of the halohydrin ether at a temperature of about 80° C. to about 90° C.

KENNETH E. MARPLE.

REFERENCES CITED

The following references are of record in the file of this patent:

UNITED STATES PATENTS

| Number | Name | Date |
|---|---|---|
| 2,130,525 | Coleman | Sept. 20, 1938 |
| 2,181,100 | Slagh | Nov. 21, 1939 |
| 2,221,771 | Alquist | Nov. 19, 1940 |
| 2,314,039 | Evans | Mar. 16, 1943 |
| 2,327,053 | Marple et al. | Aug. 17, 1943 |